United States Patent

Cummings et al.

[11] Patent Number: 5,915,334
[45] Date of Patent: Jun. 29, 1999

[54] HYDRAULICALLY CONTROLLED ANIMAL TABLE AND METHOD OF USE

[76] Inventors: Chet H. Cummings, HC 69 Box 2121, Winnett, Mont. 59087; Jerry Akre, R.R. 2 Box 2028, Lewistown, Mont. 59457

[21] Appl. No.: 09/066,926

[22] Filed: Apr. 28, 1998

[51] Int. Cl.⁶ ............................ A01K 15/04; A01K 29/00
[52] U.S. Cl. ............................ 119/723; 119/756; 119/757
[58] Field of Search ........................................ 119/726, 722, 119/723, 724, 755, 756, 757, 732, 733; 5/610, 614; 452/54

[56] References Cited

U.S. PATENT DOCUMENTS

| | | | |
|---|---|---|---|
| 407,610 | 7/1889 | Price | 119/724 |
| 572,792 | 12/1896 | Gates | 119/723 |
| 1,599,134 | 9/1926 | King | 452/54 |
| 2,458,582 | 1/1949 | Flohr, Jr. | 119/723 |
| 2,477,213 | 7/1949 | Staggs | 119/723 |
| 2,674,980 | 4/1954 | Bentley | 119/723 |
| 2,688,949 | 9/1954 | Butts | 119/723 |
| 2,828,172 | 3/1958 | McDonald | 5/610 |
| 3,308,790 | 3/1967 | Crowson | 119/724 |
| 3,590,784 | 7/1971 | Fly | 119/722 |
| 4,148,280 | 4/1979 | Masuda et al. | 119/757 |
| 4,214,555 | 7/1980 | Sawby | 119/732 |
| 4,312,300 | 1/1982 | Hopkins | 119/723 |

FOREIGN PATENT DOCUMENTS

| | | | |
|---|---|---|---|
| 854384 | 8/1981 | U.S.S.R. | 119/756 |
| 990212 | 1/1983 | U.S.S.R. | 119/723 |
| 1486162 | 6/1989 | U.S.S.R. | |
| 2173082 | 10/1986 | United Kingdom . | |

Primary Examiner—Michael J. Carone
Assistant Examiner—James S. Bergin
Attorney, Agent, or Firm—Richard C. Litman

[57] ABSTRACT

A hydraulically controlled portable dual table with a gate which enables the examination of a calf or a sheep by restraining the animal while the rotatable tables are vertical with neck and body catches of one table. The table and animal are rotated to a horizontal position for examination, branding, dehorning or castration. The table and animal are returned to a vertical position and the neck and body catches released. The second table is employed to restrain the animal with its neck and body catches and lifted to a horizontal position for examination of the other side of the animal. The operation of the hydraulic controls and the examination can be performed by one person.

14 Claims, 6 Drawing Sheets

HYDRAULICALLY CONTROLLED ANIMAL TABLE AND METHOD OF USE

BACKGROUND OF THE INVENTION

1. Field of the Invention

The present invention relates generally to a versatile animal restraining and examining apparatus and its method of use. More specifically, two hydraulically controlled tables on a frame are used alternately to examine both sides of a calf or a sheep while restrained by a neck catch and a body catch. The animal is led into the apparatus, both the folded and upright tables defining a passageway blocked by a pivotable gate. The neck and body catches from one table are applied and the table unfolded and rotated to a horizontal position for examination of one side of the animal. The animal is returned to a standing position, the neck and body catches are released, and the other neck and body catches on the opposite table are applied to repeat the process.

2. Description of the Related Art

The related art of interest describe various apparatus for restraining animals for various purposes. The related art will be discussed in the order of perceived relevance to the present invention.

U.S. Pat. No. 2,458,582 issued on Jan. 11, 1949, to H. Flohr, Jr. describes a cattle restraining device which is placed against an opening in the pen. A tubular framework comprising (1) a vertical wall which includes the opening, (2) a base frame with an elevated support upon which a flat side member element pivots from a vertical position, (3) a tubular vertically disposed animal holder element pivoting on a base board; and (4) two shields which block the opening being attached to the flat side member and the animal holder once the cow or bull is within the restraining device. The animal holder and the flat side member are clamped together on top by a handled rack strip extending from the animal holder and secured in a catch plate on the flat side member. The restrained cow is elevated to a horizontal position by manually rotating the flat side member and the animal holder about the horizontally disposed elevated support of the base frame. Optional leg clamps can be provided on the animal holder element for branding, dehorning or surgically treating the cow or bull. The device is distinguishable for lacking automatic means and a forward exit gate.

U.S. Pat. No. 2,674,980 issued on Apr. 13, 1954, to Grant D. Bentley describes a reversible calf table. A quadrilateral shaped tubular frame with an extended base frame as viewed from an end serves as pivoting stand for the calf table. The rotating calf table or main gate has a U-shaped tubular frame member supporting a sheet metal plate and supports two wooden frame bars at the front (to form a stanchion to hold the calf's neck). The three parts are hinged at their feet to a U-bracket (and a foot board) for restraining the calf's head. The body of the calf is restrained by an auxiliary gate hinged to the same U-bracket and has removable bars for access to the calf. Locking devices for both the stanchion and the auxiliary gate are provided by ratchet bars. The stanchion can be removed from one end of the calf table and mounted on the opposite end. The apparatus is distinguishable for its clamping of the calf by two extensive sides and a non-opening gate at an end.

U.S. Pat. No. 2,688,949 issued on Sep. 14, 1954, to Claud Butts describes an animal energized rotating calf cradle which is similar in structure to Bentley's apparatus. The stanchion gates are moved outwards from the U-shaped cradle member by appropriate linking means and locked in place to hold the calf's neck. The rectangular frame supports the body and clamped down by the clamp body having the vertical removable bars as in Bentley. The cradle is rotated on the base structure by flanged quadrant-shaped rocker elements at each end which traverse the top of the base structure. The calf cradle apparatus is distinguishable for the requirement for clamping the calf body with two side panels and the neck with stanchions.

U.S. Pat. No. 4,214,555 issued on Jul. 29, 1980, to Ken Sawby describes a trailerable cattle vise with a box frame, retractable wheels and a trailer hitch used for trimming hooves out on the range. Two V-shaped side panels, one fixed and the other movable clamp the animal's body inside the box frame. A stanchion for clamping the neck is formed in an open portion of the front panel. Hydraulic means are provided to rotate the box frame and animal about two vertical posts to enable access to the hooves. Another hydraulic means is utilized to lower the wheels and raise the box frame. The apparatus is distinguishable for its reliance on a vise structure which is trailerable.

U.S. Pat. No. 4,148,280 issued on Apr. 10, 1979, to Hideo Masuda et al. describes a livestock holder for castrating a pig. A stand with folding legs supports the pig upside down with a body clamp formed from two side clamps having rubber sheeting. The head is not clamped but rests on a semicircular head rest mounted on a control member or rod. The body clamp is operated by foot control with hydraulic power. The apparatus is distinguishable for its lack of head clamp and non-rotatable body clamp.

U.K. Patent Publication No. 2,173,082 published on Oct. 8, 1986, for Ian A. Mowat describes an animal inspection apparatus. scribes a veterinary stand having a shaft with bracketed rollers which fit in guides mounted on the rear side of a platform holding the animal by its legs by fasteners on telescopic supports.

Soviet Union Patent No. 854,384 issued on Aug. 18, 1981, describes a pig immobilizer wherein the rotatable and height adjustable animal holding frame pivots in a wheeled rectangular framework which is also adjustable in height. Three resilient and lockable belts are positioned to support the pig's head, limbs and rear end for surgery. The pig is led onto the holding frame, strapped to the holding frame and rotated to an upside down position. Adjustable height supports at either end permit also the inclination of the pig within the rectangular framework. The apparatus is distinguishable for its hand strappable belted structure.

Soviet Union Patent Application No. 1,486,162 published on Jun. 15, 1989, describes a veterinary stand with a U-shaped support on wheels having a shaft with rollers fitting in guides mounted in the rear side of the platform. The animal is positioned on its back on the platform with the legs spread-eagled and strapped to telescopic looped fasteners. The apparatus is distinguishable for its singular platform and telescopic leg restraints.

U.S. Pat. No. 2,828,172 issued on Mar. 25, 1958, to Robert L. McDonald describes a medical examination, operating and X-ray table utilized by urologists. Foot pedal controls are provided for hydraulically raising, lowering or tilting the table. The apparatus is distinguishable for its single table designed for examination of humans.

U.S. Pat. No. 1,599,134 issued on Sep. 7, 1926, to Bertell W. King describes a humane animal securing, killing, and casting machine. An upright square based framework supports a clamping body drum with attached neck shackles, two inner inflatable receiving pads lining the body drum, and a separate head clamp all operated by air pressure. After killing the animal, the body drum is tilted to remove the carcass. The apparatus is distinguishable for its two-piece neck and head clamps, and the one-piece body drum.

None of the above inventions and patents, taken either singularly or in combination, is seen to describe the instant invention as claimed. Thus, a hydraulically controlled animal restraining table solving the aforementioned problems is desired.

SUMMARY OF THE INVENTION

Accordingly, it is a principal object of the invention to provide a portable dual table apparatus for animal examinations.

It is another object of the invention to provide a portable dual table apparatus that is foldable.

It is a further object of the invention to provide a portable dual table apparatus with semicircular head and body restraint means which can be rotated to secure and to release.

Still another object of the invention is to provide a portable dual table apparatus with hydraulic means to operate the closing and opening of the gate, folding and unfolding of each examination table, and the securing or releasing of the head and body restraint means.

Yet another object of the invention is to provide a portable dual table apparatus with a gate which is closable and openable.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
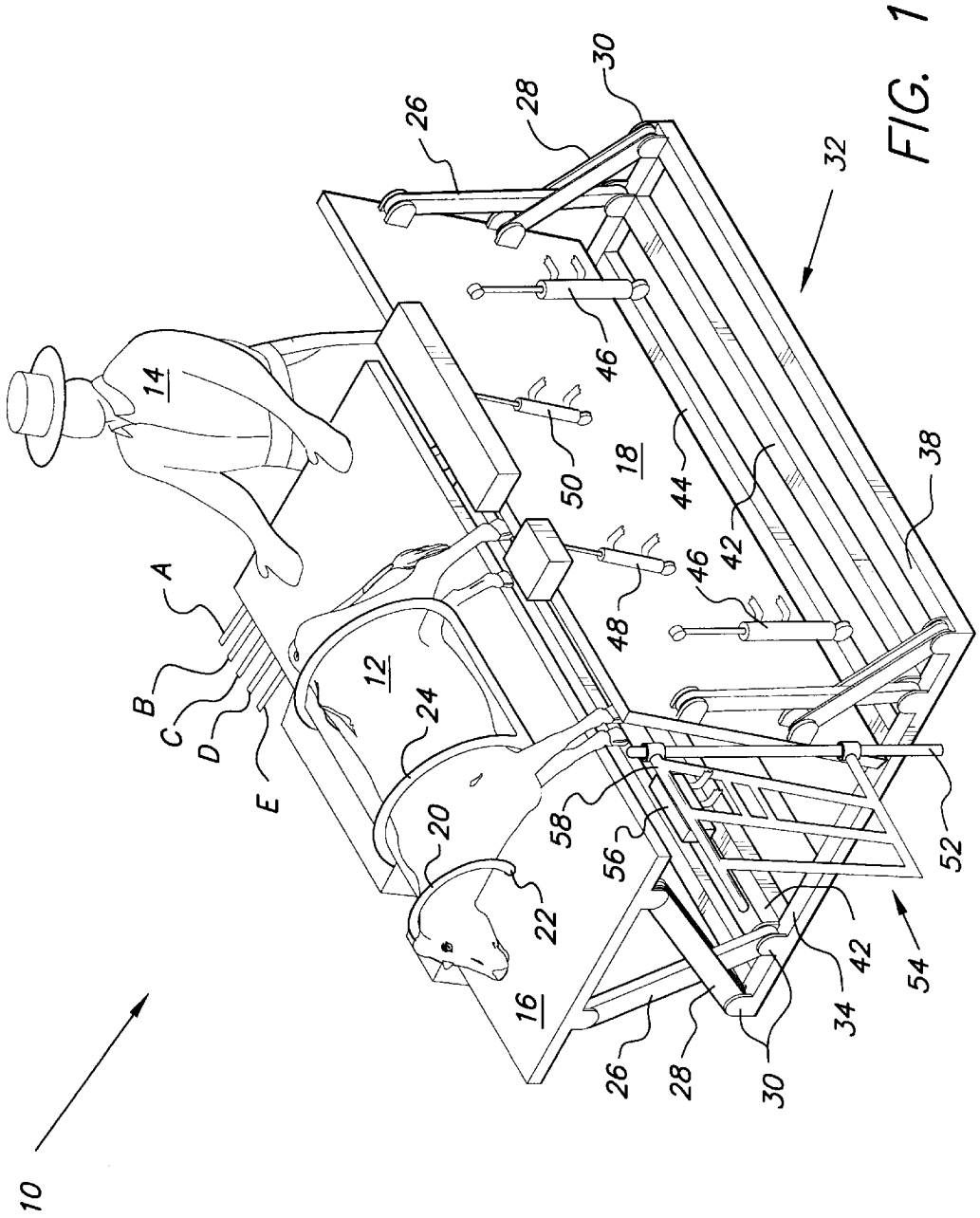
FIG. 1 is an environmental, perspective view of a hydraulically controlled calf table with a secured calf and a man preparing for the examination according to the present invention.

The dual calf table apparatus 10 of the present invention is illustrated in FIG. 1 with a calf 12 and an operator 14 preparing for an examination of the calf on the left folding table 16. The right table 18 remains unfolded. The neck catch 20 of the left table is a semicircular rod 22 with a rotatable mechanism covered by a meshed cover for opening and closing the neck catch 20. The body catch 24 is U-shaped and semicircular to partially encircle the body and pin the calf 12 to the left table 16 (see FIGS. 2 and 3). The left table is supported by a leg 26 which slides within the double segments of the other leg 28. Legs 26, 28 are pinned at their opposite ends to the tables 16, 18 by pins in U-shaped brackets 30. The rectangular base frame 32 has a front edge member 34 and a rear edge member 36 which support the legs 26, 28. The front and rear edge members are joined by a right outside edge member 38 and a left outside edge member 40 and two intermediate strut members 42. A floor board 44 is centered in the base frame 32.

Two hydraulic cylinders with rams 46 are fastened on each side of the floor board 44 and the rear surfaces of the tables 16 and 18 for extending and folding the tables. A hydraulic cylinder and ram 48 actuates the neck catch 20. Hydraulic cylinder and ram 50 actuates the body catch 24.

Figure 2:
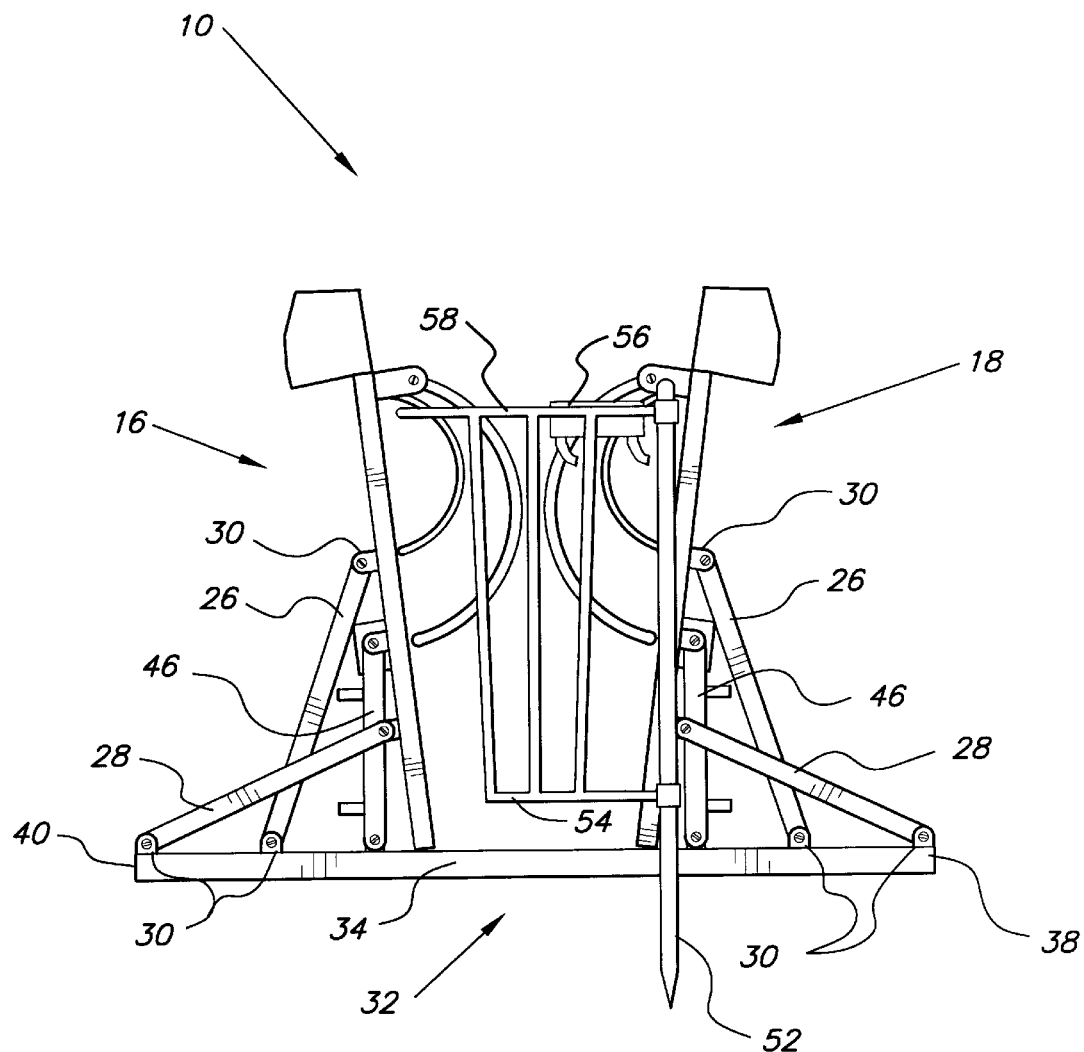
FIG. 2 is a front view of the dual folded tables of the present invention without the hydraulic cylinder apparatus.
Figure 3:
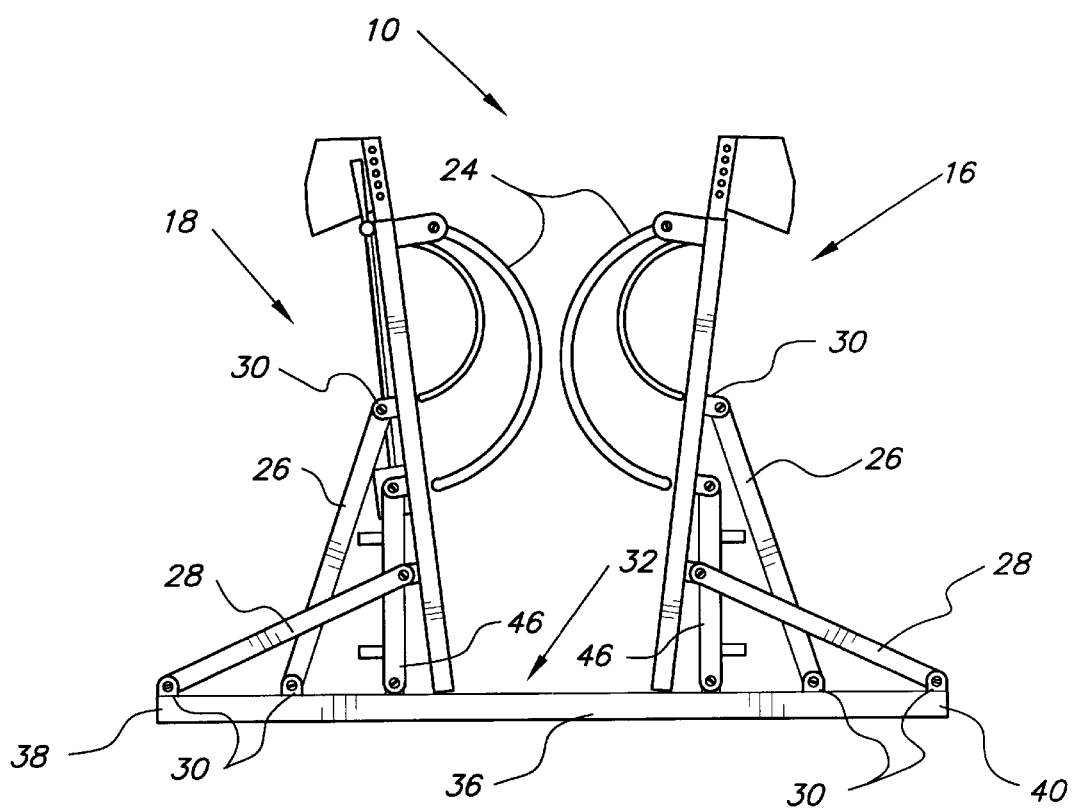
FIG. 3 is a rear view of the dual folded tables of the present invention without the gate and the hydraulic cylinder apparatus.

In FIGS. 1 and 2, a post 52 attached to the base frame 32 on the front edge member 34 supports a gate 54 which opens and closes the opening between the folded tables 16, 18 by actuation of a hydraulic cylinder and ram 56 located behind the top bar 58 and based on the post 52.

Figure 4:
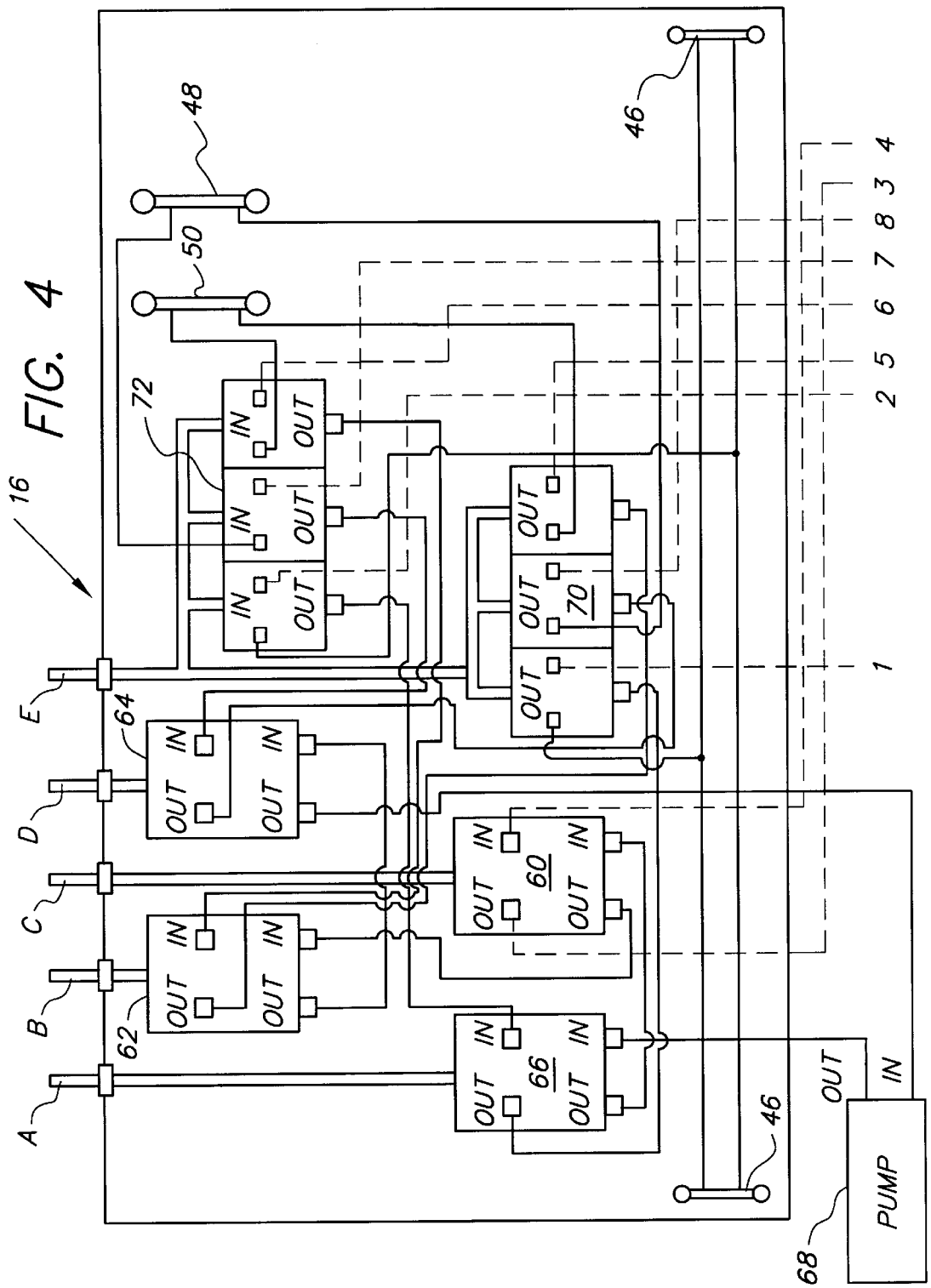
FIG. 4 is a bottom view of the left side table showing its hydraulic system.
Figure 5:
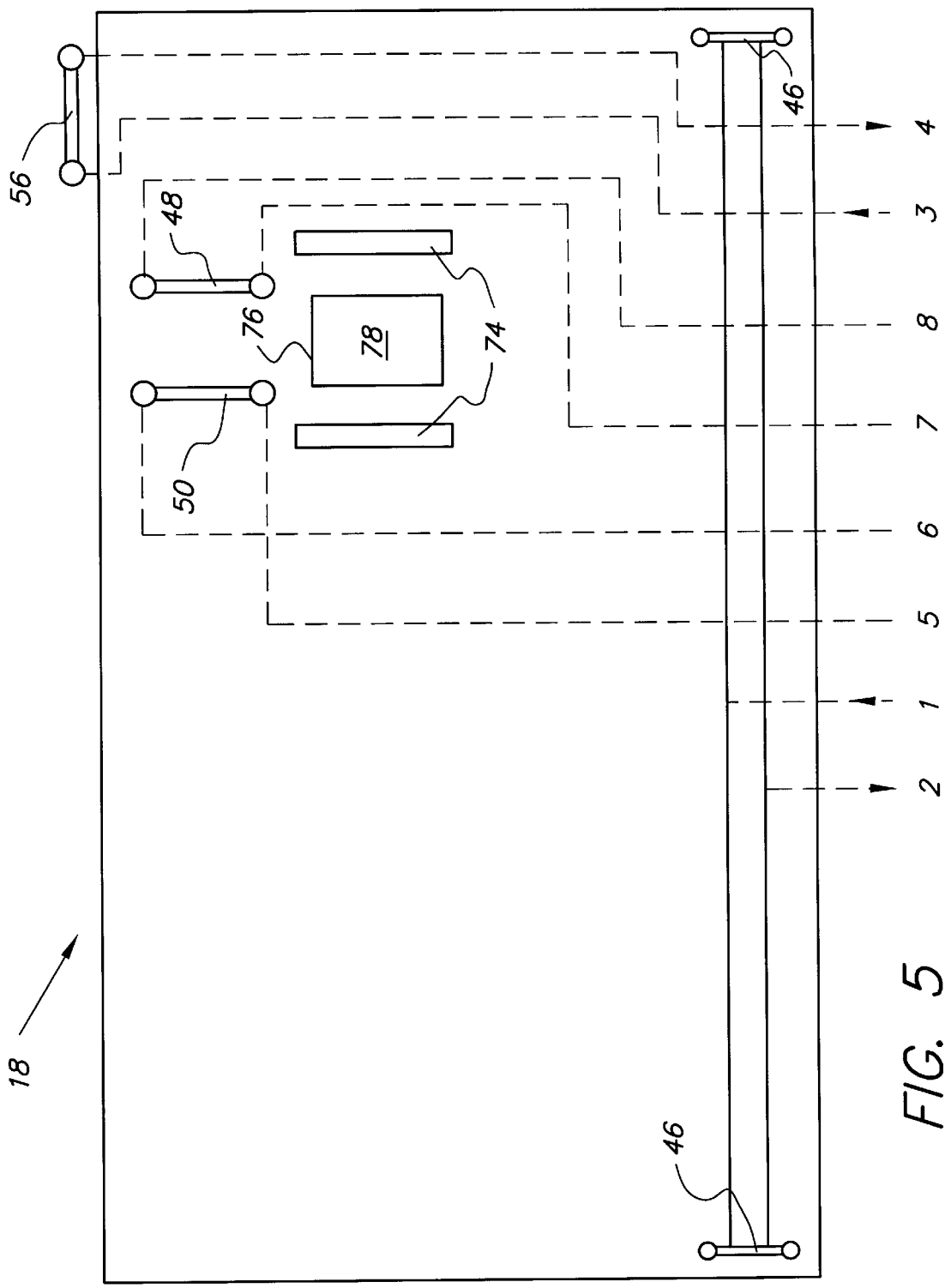
FIG. 5 is a bottom view of right side table showing the hydraulic system and the slots to accommodate the catches for the body and head.

The operation of the apparatus 10 is accomplished by manipulating five levers A, B, C, D, and E located on the outside edge of the left table 16; the functions of the levers will be discussed with the explanation of FIGS. 4 and 5. The levers are connected to 2-position switches operated by pushing the lever forward or pulling backward. It should be noted that the front gate position is the reference point for determining right and left positions as well as front and rear positions of the apparatus 10.

The procedure in restraining the calf 12 in the apparatus 10 begins with the tables 16, 18 folded and the gate 54 closed by pushing lever C forward and activating the hydraulic valve unit 60 and hydraulic line 3, and leading in the calf 12 head first. Levers B and D are pushed forward to lower the body catch 24 (line 6) and the neck catch 20 (line 8) to restrain the calf 12 against the left table 16 by activating the respective hydraulic valve units 62 and 64 and line 8.

Lever A operates the right and the left folding tables 18 and 16, respectively, provided that lever E is placed in a position, forward or back, to provide the hydraulic pressure for the specific table. When levers A and E are in forward positions, table 16 unfolds its legs 26, 28 by actuating the "IN" position of the hydraulic valve unit 66 (and the corresponding hydraulic cylinder to extend its ram) by a hydraulic line 9 from the pump 68, line 2, and the hydraulic valve unit 70 for the splitter lever E as seen in FIG. 4. Thus, the two hydraulic cylinders 46 located proximate the bottom edge raise the left table 16. FIG. 5 shows two vertical slots 74 for accommodating the body catch 24 of the left table 16 and a rectangular aperture 76 covered with a rubber flap 78 for accommodating the body of the calf 12. The left table 16 is now in a horizontal position and the calf 12 is ready for inspection, branding, dehorning and the like. It is noted that the left table 16 as depicted in FIG. 4 does not show the vertical slots 74 and the aperture 76 for purposes of providing space for illustrating the hydraulic devices and their line connections.

The left table 16 with the calf 12 is now lowered to a vertical position by pulling back on the lever A (line 1) and releasing the body catch 24 (line 5) and the neck catch 20 (line 7) by pulling back on the respective levers B and D. Now the other side of the calf 12 can be restrained for examination by pushing forward the levers B and D to lower the body catch 24 and the neck catch 20, respectively.

The right table 18 can now be raised to a horizontal position by pulling back on the splitter lever E to switch to the right table control for lever A by activating the hydraulic valve unit 72, and now pushing lever A forward to activate the hydraulic valve unit 66 to unfold the table 18 and return the hydraulic fluid to the main return line 11.

After examination of the right side of the calf 12, the right table 18 is lowered and the neck and body catches 20, 24 are raised by the appropriate respective levers A, D and B. The gate 54 is opened by pulling back lever C (line 4) to allow the calf 12 to exit the apparatus 10.

Figure 6:
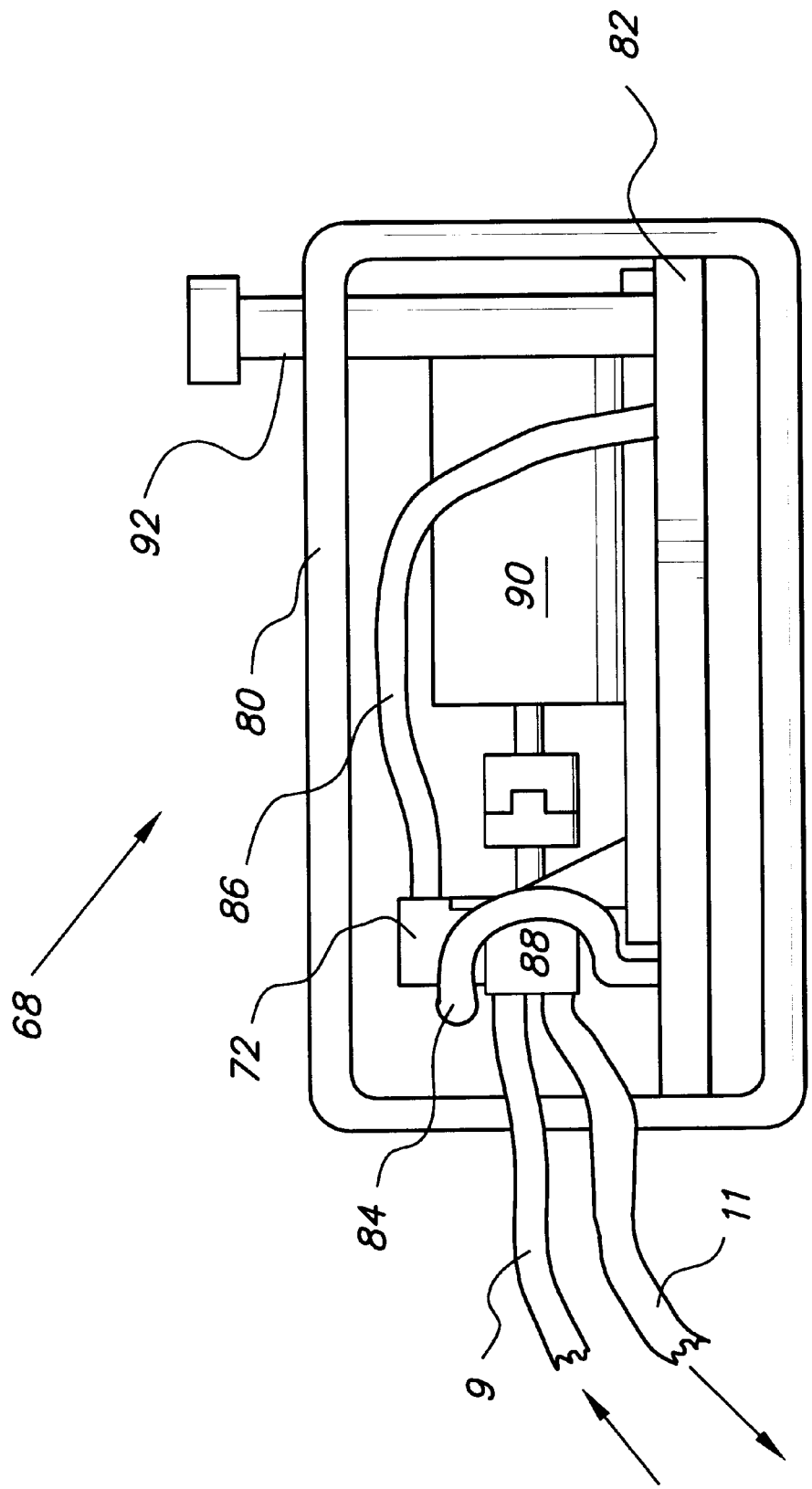
FIG. 6 is a side elevational view of the portable hydraulic pump unit with a side panel removed.

The pump unit 68 shown in FIG. 6 comprises a housing 80 with inlet hydraulic fluid line 9 and outlet hydraulic fluid line 11. A hydraulic fluid reservoir 82 with an inlet line 84 and an outlet line 86 is connected to the filter 72 on the pump 88. A gas engine 90, either 2-cycle or 4-cycle, and its exhaust pipe 92 complete the pump unit 68.

It is noted that another gate (not shown) can be added to the entrance of the apparatus 10 with duplication of the gate 54, post 52 and the hydraulic system described.

Thus, a portable apparatus with dual calf tables has been described which enable a single person to operate and to examine a calf, lamb or the like up to 500 lbs. in weight with minimum injury to the animal.

It is to be understood that the present invention is not limited to the embodiments described above, but encompasses any and all embodiments within the scope of the following claims.

We claim:

1. A hydraulically controlled animal restraining dual table apparatus comprising:

a rectangular base frame having a front end and a rear end bridged by a right side and a left side;

a left side folding table and a right side folding table based on the rectangular base frame, each folding table having a top side, a bottom side and folding legs attached on a front end and a rear end of said bottom side;

each folding table having a curvilinear neck catch element and a curvilinear U-shaped body catch element attached on the top side;

a gate openable outward from a central region and hinged on a separate post at the front end of the rectangular base frame; and hydraulic means to open and close the gate, to rotate the neck catch and the body catch of one table to hold an animal against the table, to unfold said one table by rotating it upward from a folded vertical position to a horizontal position;

whereby the secured animal can be held for examination and performance of an operation.

2. The dual table apparatus according to claim 1, including a portable hydraulic pumping unit for providing the hydraulic means with power.

3. The dual table apparatus according to claim 1, wherein five control levers are located on the left side table on its outside left edge, for controlling the functions of the tables' rotations, the opening and closing of the gate, the rotations of the neck catch and the body catch, and the selection of a specific table for rotation.

4. The dual table apparatus according to claim 1, wherein the right side table has two slots parallel to a rectangular cutout for providing space for the body catch of the left side table.

5. The dual table apparatus according to claim 1, wherein a predetermined number of hydraulic means includes hydraulic cylinders, valves and tubing which are positioned on the bottom side of the left side table.

6. The dual table apparatus according to claim 1, wherein the right side table is dimensioned and configured for examination of the right side of the animal.

7. The dual table apparatus according to claim 1, wherein the left side table is dimensioned and configured for examination of the left side of the animal.

8. The dual table apparatus according to claim 1, wherein the apparatus has a holding capacity of an animal weighing 500 lbs.

9. A method of restraining an animal on an examination table comprising:

providing a rectangular base frame supporting two folded vertically orientated tables on opposite sides and a gate on one end of a passageway between the folded tables;

leading in an animal from an open end of the passageway and up to the gate;

providing a neck catch and a body catch on at least one of the folded tables to restrain and hold the animal against the table;

rotating the table holding the animal to a horizontal position; and examining the restrained animal.

10. The method according to claim 9, wherein the examination includes a procedure selected from the group consisting of branding, dehorning and castrating.

11. The method according to claim 10, wherein the procedure is branding.

12. The method according to claim 11, including further the steps of returning the animal to a vertical position and releasing the neck catch and body catch, restraining the animal with a neck catch and a body catch from the opposite vertically orientated folded table, and rotating the animal and table to a horizontal position, and examining an opposite side of the animal.

13. The method according to claim 10, wherein the procedure is dehorning.

14. The method according to claim 10, wherein the procedure is castration.

* * * * *